United States Patent [19]
Weissberg et al.

[11] Patent Number: 6,001,892

[45] Date of Patent: Dec. 14, 1999

[54] POLYESTER AND VINYL ETHER RADIATION CURABLE COMPOSITIONS WITH REACTIVE DILUENT

[75] Inventors: Alan B. Weissberg, Pittsburgh; Edward E. McEntire, Hampton Township, Allegheny County; Charles B. Friedlander, Shaler Township, Allegheny County, all of Pa.

[73] Assignee: PPG Industries Oho, Inc., Cleveland, Ohio

[21] Appl. No.: 08/999,685

[22] Filed: Feb. 16, 1996

Related U.S. Application Data

[63] Continuation of application No. 08/270,286, Jul. 5, 1994, abandoned.

[51] Int. Cl.$^6$ .............................. C08F 2/50; C08F 16/16; C08G 63/52; C08L 67/06
[52] U.S. Cl. ..................... 522/107; 522/104; 522/168; 522/179; 522/181; 525/39; 525/44; 526/323; 526/332; 526/333
[58] Field of Search ..................................... 522/104, 107, 522/181, 167, 168, 179; 525/39, 44; 526/323, 333; 528/306, 417

[56] References Cited

U.S. PATENT DOCUMENTS

| | | | |
|---|---|---|---|
| 3,260,705 | 7/1966 | Slocombe et al. | 260/78.5 |
| 4,749,807 | 6/1988 | Lapin et al. | 560/91 |
| 4,751,273 | 6/1988 | Lapin et al. | 525/455 |
| 4,845,265 | 7/1989 | Lapin et al. | 560/84 |
| 5,334,455 | 8/1994 | Noren et al. | 428/413 |
| 5,334,456 | 8/1994 | Noren et al. | 522/107 |

FOREIGN PATENT DOCUMENTS

| | | | |
|---|---|---|---|
| 0322808 | 7/1989 | European Pat. Off. | 522/107 |
| WO 92/14764 | 9/1992 | European Pat. Off. | |
| WO 90/10660 | 9/1990 | WIPO | 522/107 |

OTHER PUBLICATIONS

"Non–Acrylic Free Radical Coplymerizable Systems for UV/EB Curing", J. J. Schouten, G. K. Noren, and S. C. Lapin, DSM Desotech Inc., Elgin, Illinois, USA.

*Primary Examiner*—Susan W. Berman
*Attorney, Agent, or Firm*—Paul S. Chirgott; Dennis G. Millman

[57] ABSTRACT

A liquid, radiation curable composition is disclosed that includes a reactive diluent to lower initial application viscosity without substantial reduction of cure rate. The composition of the present invention comprises: (a) an unsaturated polyester polymer; (b) a non-polymerized, cocurable polyfunctional vinyl ether component; and (c) a reactive diluent which is an unsaturated dioic acid ester having the following structural formula:

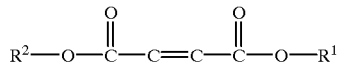

wherein at least one of $R^1$ and $R^2$ is a group that includes an oxygen with a carbon adlacent thereto and an abstractable hydrogen attached to the carbon.

20 Claims, No Drawings

POLYESTER AND VINYL ETHER RADIATION CURABLE COMPOSITIONS WITH REACTIVE DILUENT

This application is a file wrapper continuation of application Ser. No., 08/270,286 filed Jul. 5, 1994, now abandoned.

BACKGROUND OF THE INVENTION

The present invention relates to liquid, radiation curable compositions, particularly coating compositions, containing an unsaturated polyester component in combination with a vinyl ether component. Such compositions have rapid cure rates initiated by exposure to ultraviolet light or electron beam.

Radiation curable coating compositions based on unsaturated polyester polymers and vinyl ether compounds are the subject of commonly owned, co-pending U.S. Pat. No. 5,536,760 to Charles B. Friedlander and David A. Diehl, which corresponds to European Patent Publication 0 322 808. The use of unsaturated polyester polymers in such compositions, particularly polyesters having relatively high molecular weight, is desirable in that they can produce very good final film properties. However, some unsaturated polyesters that are preferred for their desirable final film properties tend to render the viscosity of the coating formulations unacceptably high for conventional coating application processes.

These coatings also contain vinyl ether compounds of the general formula $R-(O-CH=CH_2)_n$ (where R may be selected from a wide variety of alkyl (groups, and n is at least 1, preferably greater than 1.0). The vinyl ethers are used to produce a three dimensional crosslinked network, and they may also serve to reduce the initial application viscosity of the formulation during coating application. However, the use of the vinyl ether component to reduce viscosity of the coating composition has limits. When formulating such compositions, the stoichiometric ratio of unsaturated bonds in the polyester polymer component to the unsaturated bonds in the vinyl ether component is typically about 1:1. Increasing the vinyl ether component content above the 1:1 stoichiometry in order to reduce viscosity is not an attractive alternative due to the relatively high cost of vinyl ethers and because the excess vinyl ether component may remain uncrosslinked under typical free radical initiated radiation curing conditions. Residual uncrosslinked vinyl ether component remaining after curing may result in a degradation of the final cured film properties.

It is also known to employ reactive diluents (i.e., those that react into the cured film molecular network) such as styrene to reduce the initial viscosity of coating compositions without substantially sacrificing final film properties. Styrene is not desirable as a reactive diluent for radiation curable compositions of the type involved here because styrene slows the cure rate, which is one of the attractive features of these coating compositions.

Solvents are commonly used to reduce the viscosity of coating compositions during application, but the use of solvents is not desirable with the radiation curable coatings of the type involved here. These coatings may be made extremely low in volatile organic content, whereby they are attractive from an environmental standpoint. Using solvents to reduce the viscosity would detract from this desirable feature.

It would be desirable to utilize the advantages of cured film properties yielded by unsaturated polyester polymers in coating compositions having suitable viscosities for application without the disadvantages of substantially higher cost, substantially slower radiation cure rate, or addition of volatile organic components.

SUMMARY OF THE INVENTION

The present invention is a liquid, radiation curable composition that includes a reactive diluent to lower initial application viscosity without substantial reduction of cure rate. The composition of the present invention comprises: (a) an unsaturated polyester polymer; (b) a non-polymerized, cocurable polyfunctional vinyl ether component; and (c) a reactive diluent having the following structural formula:

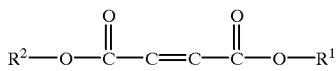

wherein at least one of $R^1$ and $R^2$ is a group that includes an oxygen with a carbon adjacent thereto and an abstractable hydrogen attached to the carbon. $R^1$ and $R^2$ may be methyl, alkyl, cycloalkyl, or aralkyl groups; and at least one of $R^1$ and $R^2$ includes a hydroxyl group, ether, or carbonate group. More particularly, at least one of $R^1$ and $R^2$ may be a group having the structure:

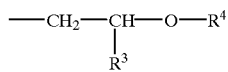

where $R^3$ and $R^4$ are hydrogen, methyl, alkyl, cycloalkyl, aralkyl groups, or $R^3$ and $R^4$ join to form a heterocyclic ring. An example of $R^3$ and $R^4$ joined to form a heterocyclic ring is a tetrahydrofurfuryl group.

One useful class of reactive diluents of the present invention includes hydroxyl containing ethylenically unsaturated dioic acid esters. Another example of a useful class of reactive diluents comprises ethylenically unsaturated dioic acid esters of tetrahydrofurfuryl alcohol. Coating compositions containing such reactive diluents have been found to be particularly suitable for use as radiation curable coating formulations, wherein the initial application viscosity is low, but little or none of the viscosity-reducing diluent remains unreacted after curing.

The present invention is also a method of coating which includes the steps of applying to a substrate a film of a liquid, radiation curable composition of the invention as set forth above, and curing the composition through its thickness to a tack-free state by exposing the film to ionizing radiation (e.g., electron beam) or actinic light (e.g., ultraviolet light). The ethylenic unsaturation of the reactive diluent component is available for curing (crosslinking) into the cured polymeric network.

DETAILED DESCRIPTION OF THE INVENTION

A composition of the invention is liquid and is capable of being cured by the application of ionizing radiation, such as electron beam radiation, or actinic light, such as ultraviolet light (UV). The composition is a liquid of sufficiently low viscosity that it can be applied to a substrate utilizing conventional coating application techniques such as roll coating, curtain coating, doctor blade coating, and/or spray coating. Generally, a composition of the invention will have a viscosity at 25° C. of from 10 to 50,000 centipoises (cPs), preferably from 100 to 5,000 cPs.

The preparation of the unsaturated polyester component of the liquid, radiation curable composition, for example by the reaction of unsaturated polycarboxylic acid or anhydride with polyhydric alcohol, is well known in the art. Processes for making unsaturated polyesters include batch processes and continuous processes. Usually, an unsaturated carboxylic acid having an acid functionality of at least two, more particularly a dicarboxylic acid or its anhydride, is utilized as a starting reactant. Examples of unsaturated dicarboxylic acids and anhydrides include: maleic acid, maleic anhydride, fumaric acid and itaconic acid. Maleic anhydride is a desirable dicarboxylic component to make the unsaturated polyester resin since it is relatively inexpensive. Dicarboxylic esters of low boiling alcohols are also useful in the practice of the invention.

Unsaturated polyesters for use in the present invention may be prepared utilizing a saturated polycarboxylic acid as a portion of the polycarboxylic acid monomers. Thus, from 0 to 75 weight percent of the polycarboxylic acid used in the polyester synthesis may be saturated polycarboxylic acid. As used herein, "unsaturated" is not intended to include aromatic groups, so polycarboxylic acids containing aromatic groups are classified as "saturated" for the purposes of the present invention. Examples of saturated polycarboxylic acids which optionally may be used include phthalic acid, isophthalic acid, terephthalic acid, trimellitic acid, tetrahydrophthalic acid, hexahydrophthalic acid, tetrachlorophthalic acid, adipic acid, azelaic acid, sebacic acid, succinic acid, glutaric acid, malonic acid, pimelic acid, suberic acid, 2,2-dimethylsuccinic acid, 3,3-dimethylglutaric acid, and 2,2-dimethylglutaric acid. Anhydrides of the aforementioned acids, where they exist, and esters of low boiling alcohols such as methanol, also can be utilized.

Examples of polyols suitable for preparing the unsaturated polyester resin include: diethylene glycol, ethylene glycol, propylene glycol, dipropylene glycol, butylene glycol, glycerol, neopentyl glycol, trimethylolpropane, pentaerythritol, sorbitol, 1,6-hexanediol, 1,4-cyclohexanediol, 1,4-cyclohexanedimethanol, and 1,2-bis(hydroxyethyl)cyclohexane. Polyols which are diols are preferred. Diethylene glycol is particularly preferred since it is readily available and is relatively inexpensive. While polyols having a hydroxyl functionality of greater than 2 may be employed in the preparation of the unsaturated polyester resin, it is preferred that the major portion, if not all, of the unsaturated polyester resin be comprised of unsaturated polyester molecules which are linear, and therefore diols are preferred.

The unsaturated polyester resins may be prepared by heating the polycarboxylic component and organic polyol component together for about 1 to 10 hours to temperatures of from about 165° C. to about 250° C., with water formed during the esterification being distilled off using a sparge of an inert gas such as nitrogen. Esterification catalysts for increasing the rate of reaction can also be used. Examples of known catalysts useful for this purpose include para-toluenesulfonic acid, butylstannoic acid, dibutyltin oxide and stannous fluoride. The molecular weight of unsaturated polyester resins suitable for a composition of the invention may vary widely. However, generally the unsaturated polyester resin has a peak molecular weight, as measured by gel permeation chromatography using a polystyrene standard, of from 500 to 50,000, preferably of from 1,000 to 25,000. Some embodiments may include more than one unsaturated polyester, in which case it is preferred to include one or more unsaturated polyesters from the low end of the molecular weight ranges set forth above and one or more unsaturated polyesters from the high end of the molecular weight ranges.

Radiation curable compositions of the present invention utilize a vinyl ether component that provides an average of at least two vinyl ether groups per molecule of the vinyl ether component. The vinyl ether component is of the general formula R—(O—CH=CH$_2$)$_n$ where R may be selected from a wide variety of alkyl groups (generally containing greater than one carbon atom) or aryl groups, and may include alkyl or aryl ethers and alkyl or aryl esters, and n is at least 1, preferably greater than 1.0). Such products are commercially available. The vinyl ether groups of the vinyl ether component are different from and cocurable with the ethylenically unsaturated moieties in the backbone of the unsaturated polyester (e.g., provided from the residue of unsaturated carboxylic acid used to make the unsaturated polyester). By "cocurable" is meant that the vinyl ether groups are stable in admixture with the unsaturated polyester resin, but become reactive with the ethylenic unsaturation of the unsaturated polyester upon exposure to ionizing radiation (electron beam radiation) or actinic light (ultraviolet). It will be understood that when a composition of the invention is to be cured utilizing actinic light such as ultraviolet light, a photoinitiator and/or photosensitizer may be combined with the composition of the invention either prior to or at the time of curing. Optionally, the vinyl ether component may include vinyl ether groups pendent from the polyester component, in which case only a single cocurable vinyl ether moiety need be present in such a pendent vinyl ether group. For the purposes of the present invention, a monofunctional vinyl ether group pendant from the polyester polymer may be considered equivalent to a divinyl ether group. Polyvinyl ether compounds having more than two vinyl ether groups could also be used with the present invention. An additional vinyl component may be present in the composition that may comprise monovinyl compounds.

The reactive diluent component of the present invention comprises a hydroxyl or ether or carbonate containing, unsaturated ester which is low in viscosity relative to the high molecular weight unsaturated polyester component. This low viscosity ester diluent will react with the vinyl ether component during curing. The unsaturated polyester resin component will also react with the vinyl ether. The sum of the equivalents of ester unsaturation (in both the main polyester resin and the ester diluent) may approximate the number of equivalents of vinyl ether groups present. The reactive diluents are 2-butene-1,4-dioic acid esters (fumarates or maleates) that contain an abstractable hydrogen. The general formulas of the reactive diluents of the present invention are:

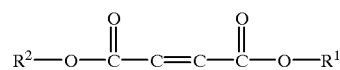

where: $R^1$ and $R^2$ are methyl, alkyl, cycloalkyl, aralkyl groups, wherein at least one of $R^1$ and $R^2$ include a hydroxyl group, an ether group, or a carbonate group.

Specific examples of suitable hydroxy containing esters of the type defined above are hydroxyethyl methyl maleate, ethyl hydroxyethyl maleate, butyl hydroxyethyl maleate, benzyl hydroxyethyl maleate, hydroxyethyl methoxyethyl maleate, hydroxypropyl methyl maleate, ethyl hydroxypropyl maleate, hydroxypropyl propyl maleate, hydroxypropyl α-methylbenzyl maleate, hydroxypropyl isobutyl maleate, hydroxypropyl hexyl maleate, hydroxybutyl methyl maleate, ethyl hydroxybutyl maleate, hydroxybutyl 2-methoxypropyl maleate, 2-hydroxy-2-phenylethyl methyl maleate, 2-hydroxy-2-phenyl isobutyl maleate, methyl 3-butoxy-2-hydroxypropyl maleate, 3-phenyl-2-hydroxypropyl methyl maleate, bis-2-hydroxypropyl maleate, bis-2-hydroxyethyl maleate, di(tetrahydrofurfuryl) maleate, di(butoxyethyl) maleate, di(methoxyethyl) maleate, and di(4-(1,3-dioxolan-2-one)methyl) maleate, and the fumarate esters corresponding to these maleate esters.

The reactive diluents of the present invention are characterized by relatively low viscosity so as to lower the initial application viscosity of the coating formulation in which they are incorporated. Generally, the reactive diluents of the present invention have viscosities at room temperature less than 1000 centipoise, preferably less than 500 centipoise, most preferably less than 300 centipoise.

The components of the coating compositions of the present invention are the unsaturated polyester component, the vinyl ether component, and the reactive diluent component, each as described above formulated in amounts familiar to those of skill in the art to attain the desired cured coating properties. Each of these three components may be present in amounts ranging from 5 to 75 percent by weight of the total of the three components. Coatings intended to be cured by means of exposure to actinic light may additionally include a photoinitiator and/or photosensitizer compound selected from many that are known in the art and are commercially available. Other additives and fillers as are conventionally employed may also be included. Pigments may be included, but are generally limited to relatively small amounts in the case of coatings cured by ultraviolet light.

THE EXAMPLES

The Examples A through E, describe the preparation of components of the coating compositions of Examples 1, 2, and 3. Example C and Examples F–M are embodiments of the reactive diluent of the present invention. Examples 4–12 present comparisons of cure response of various reactive diluents. As used in the body of the specification, examples, and claims, all percents, ratios and parts are by weight unless otherwise specifically indicated.

EXAMPLE A

Unsaturated Polyester Resin

This example illustrates the preparation of an unsaturated polyester utilized in the coating composition of Examples 1 and 2. The following was charged at room temperature to a reaction vessel equipped with a steam distillation apparatus and a nitrogen sparge:

| Material | Weight (grams) |
| --- | --- |
| 2-Methylpropanediol | 890.55 |
| Neopentyl glycol | 417.11 |
| Ethylene glycol | 33.02 |
| Dimethyl terephthalate | 832.26 |
| Butylstannoic acid | 5.60 |
| Triphenylphosphite | 5.60 |

| Material | Weight (grams) |
| --- | --- |
| Isophthalic acid | 377.65 |

| Material | Weight (grams) |
| --- | --- |
| Maleic anhydride | 662.48 |

| Material | Weight (grams) |
| --- | --- |
| Xylene | 150.00 |

Charge 1 was heated, to a temperature of 180° C., then step heated to 220° C. and held at this temperature until methanol is removed. The reactants were then cooled to 180° C. and Charge 2 was added, then heated to 240° C. until water is removed and an acid value less than 5 is obtained. The reactants were cooled to 160° C., Charge 3 was added, and heated to 170° C., at which it was held for 30 minutes. The contents of the reaction vessel were transferred into a vessel with a Dean-Stark trap and a xylene azeotrope setup. Charge 4 was then introduced into the vessel. When water began to evolve, temperature was held at a maximum of 180–190° C. When water was no longer being removed and acid value was less than 5, the remaining xylene was removed by vacuum stripping.

Example A-1

Unsaturated Polyester Resin

This example illustrates the preparation of an unsaturated polyester utilized in the coating composition of Example 3. The following was charged at room temperature to a reaction vessel equipped with a steam distillation apparatus and a nitrogen sparge:

| Material | Weight (grams) |
| --- | --- |
| 2-Methylpropanediol | 1468.97 |
| Neopentyl glycol | 688.03 |
| Ethylene glycol | 54.47 |
| Dimethyl terephthalate | 1372.82 |
| Butylstannoic acid | 8.48 |
| Triphenylphosphite | 8.48 |

| Material | Weight (grams) |
| --- | --- |
| Isophthalic acid | 622.94 |

| Material | Weight (grams) |
| --- | --- |
| Maleic anhydride | 1092.77 |

| Material | Weight (grams) |
| --- | --- |
| Xylene | 242.36 |

| Material | Weight (grams) |
| --- | --- |
| Butylated hydroxy toluene antioxidant* | 2.65 |

*"IONOL" BHT butylated hydroxy toluene antioxidant from Shell Chemical (2,6-di-tert-butyl-4-methyl phenol).

Charge 1 was heated, to a temperature of 180° C., then step heated to 220° C. and held at this temperature until methanol is removed. The reactants were then cooled to 180° C. and Charge 2 was added, then heated to 240° C. until water is removed and an acid value less than 5 is obtained.

The reactants were cooled to 160° C., Charge 3 was added, and heated to 170° C., at which it was held for 30 minutes. Charge 4 was then introduced into the vessel. The contents of the reaction vessel were transferred into a vessel with a Dean-Stark trap and a xylene azeotrope setup. When water began to evolve, Charge 5 was added, and temperature held at a maximum of 180–190° C. 80 grams of xylene were added in 20 gram increments as water was removed and acid value dropped. When water was no longer being removed and acid value was less than 5, the remaining xylene was removed by vacuum stripping.

Example B

Methyl Maleate Acid Half Ester Intermediate

This example illustrates the preparation of an intermediate used in Example C to prepare a reactive diluent in accordance with the present invention utilized in the coating composition of Examples 1 and 3.

The following were charged, at room temperature, to a suitable reaction vessel equipped with a nitrogen sparge:

| Material | Weight (grams) |
| --- | --- |
| Maleic anhydride | 3332.0 |

| Material | Weight (grams) |
| --- | --- |
| Methanol | 1196.8 |

Charge 1 was added to a round bottom triple-necked flask fitted with an agitator and a nitrogen sparge. The contents of the flask were raised to a temperature of 85° C. until the maleic anhydride was melted. The contents of the flask were then cooled to 60° C. Over a period of five hours, 1152.0 grams of Charge 2 were added to the flask under agitation, at a temperature of 60° C. After the completion of this addition, the contents of the flask were held at 60° C. for 16 hours, during which time an additional 44.8 grams of methanol were added. The contents of the flask were then transferred to a suitable container. The product of this reaction was found to have an acid value of 397.7.

Example C

Hydroxypropyl Methyl Maleate Reactive Diluent

This example illustrates the preparation of a low molecular weight unsaturated ester utilized as a reactive diluent in accordance with the present invention as shown in Examples 1 and 3. In the following procedure a pressurized reaction vessel was utilized:

| Material | Weight (grams) |
| --- | --- |
| Maleate intermediate of Example B | 2000.0 |
| Ethyl triphenyl phosphonium iodide | 4.0 |

| | |
| --- | --- |
| Propylene oxide | 1200.0 |

A one gallon autoclave was charged, at room temperature, with Charge 1. The vessel was evacuated and pressured with nitrogen three times, leaving 5 pounds per square inch gauge (34.5 kPa) nitrogen pressure on the reactor. The contents of the reaction vessel were heated to 85° C., and 1009.0 grams of Charge 2 were added over a period of 40 minutes. After 2 hours, the remaining 190.0 grams of Charge 2 were added to the reaction vessel over a period of 3 hours. The contents of the reaction vessel were then held at a temperature of 85° C. for an additional 5 hours. Residual propylene oxide was then vacuum stripped from the reaction mixture. The contents of the reaction vessel were then transferred to a suitable container. The product of the reaction had a viscosity of 80 centipoise, a density of 9.68 pounds per gallon (1.16 grams per cubic centimeter), a hydroxyl value of 257 and an acid value of 0.90.

Example D

Polyester Intermediate for Vinyl Ether

This example illustrates the preparation of a polyester intermediate utilized in the preparation of a vinyl ether containing urethane resin described in Example E.

The following initial charge was charged, at room temperature, to a suitable reaction vessel equipped with a nitrogen sparge:

| Material | Weight (grams) |
| --- | --- |
| Phthalic anhydride | 740.0 |
| Isophthalic acid | 830.0 |
| Neopentyl glycol | 1040.0 |
| Diethylene glycol | 1060.0 |
| Butylstannoic acid | 4.0 |

The above charge was added to a triple-necked round bottom flask, equipped with an agitator and a nitrogen sparge, at room temperature. The contents of the reaction vessel were heated, under agitation, to a temperature of 200° C. and held at this temperature until a hydroxyl value of 259.4 and an acid value less than 0.5 were obtained. The contents of the reaction vessel were then cooled to room temperature and transferred into an appropriate container.

Example E

Vinyl Ether Intermediate

This example illustrates the preparation of a vinyl ether containing urethane used in the coating composition of Example 3. The following initial charge was charged at room temperature to a suitable reaction vessel equipped with a nitrogen sparge:

| Material | Weight (grams) |
| --- | --- |
| Polyester intermediate of Example D | 1169.7 |

| Material | Weight (grams) |
| --- | --- |
| Isophorone diisocyanate | 1199.0 |
| Dibutyltindilaurate | 0.3 |
| DVE-3* | 1020. |

*DVE-3 is triethylene glycol divinyl ether available commercially from ISP, Inc.

| Material | Weight (grams) |
| --- | --- |
| 4 hydroxybutyl vinyl ether | 626. |

Charge 2 was added to a triple-necked round bottom flask, equipped with an agitator. Charge 1 was then added to the flask over period of two hours at 40° C., held 2 hours at 50° C., and held 1 hour at 65° C. Charge 3 was then added over a one hour period at 65° C. and held until no isocyanate was detected by infrared analysis. The contents were then permitted to cool and poured out. The product contained 100% resin solids.

Examples F–M which follow set forth additional embodiments of reactive diluent in accordance with the present invention. Examples F through L describe the preparation of other embodiments of 2-butene-1,4-dioic acid ester reactive diluents, and Examples L and M describe the preparation of reactive diluents that are dioic acid esters of tetrahydrofurfuryl alcohol.

Example F

Hydroxyethyl Methyl Maleate Reactive Diluent

This example illustrates the preparation of a hydroxyethyl methyl maleate which is useful as a reactive diluent in the practice of the invention.

| Material | Weight (grams) |
| --- | --- |
| Methyl maleate | 857.1 |
| Triphenylphosphine | 4.8 |
| Triphenylphosphite | 4.8 |

| Material | Weight (grams) |
| --- | --- |
| Ethylene oxide | 324.0 |

| Material | Weight (grams) |
| --- | --- |
| Ethylene oxide | 115.0 |

Charge 1 was added to a Parr #4 reactor which was then purged with nitrogen three times. After the temperature of the contents of the reactor was adjusted to 80° C., the pressure was measured as being 10 psig (69 kPa). At this point, Charge 2 was added over a period of 30 minutes, with cooling via a cooling coil. After the completion of this addition the pressure and temperature of the reactor were measured at 50 psig (345 kPa) and 83° C. The reaction mixture was held at 83° C. until the pressure dropped to 24 psig (165 kPa) at which point Charge 3 was added over a period of 15 minutes during which time the acid value was observed to drop to 0.54 milliequivalents acid/gram solution. The reaction mixture was then vacuum stripped at a temperature of 60° C. over a period of 30 minutes, cooled to room temperature and transferred with filtering to a suitable container. The hydroxyl value of the product was 302.6 milligrams KOH/gram resin.

Example G

Hydroxypropyl Ethyl Maleate Reactive Diluent

This example illustrates the preparation of hydroxypropyl ethyl maleate which is useful as a reactive diluent in the practice of the invention.

| Material | Weight (grams) |
| --- | --- |
| Maleic anhydride | 1297.0 |

| Material | Weight (grams) |
| --- | --- |
| Denatured ethanol | 630.7 |

| Material | Weight (grams) |
| --- | --- |
| Triphenylphosphine | 7.84 |
| Triphenylphosphite | 7.84 |

| Material | Weight (grams) |
| --- | --- |
| Propylene oxide | 1016.0 |

| Material | Weight (grams) |
| --- | --- |
| Propylene oxide | 150.0 |

Charge 1 was heated to a temperature of 60° C. until molten and then was added, while still molten, to a one gallon autoclave. After purging the reactor three times with nitrogen, Charge 2 was added over a period of five hours, after which the contents of the reaction vessel were held at 60° C. for three hours. Charge 3 was then added to the reactor, followed by an additional purge with nitrogen. With the contents of the reactor at a pressure of 10 pounds per square inch (69 kPa), the temperature was raised to 80° C. and Charge 4 was added over a period of three hours. With the temperature held at 80° C. Charge 5 was added over an additional period of three hours. The contents of the reaction vessel were then vacuum stripped to remove residual propylene oxide. After cooling to room temperature the contents of the reaction vessel were transferred to a suitable container. The product had an acid value of 0.44.

Example H

2-Hydroxy-1-Propyl 1-Methoxy-2-Propyl Maleate Reactive Diluent 2-hydroxy-1-propyl 1-methoxy-2-propyl maleate reactive diluent in accordance with the present invention was prepared as follows. To a five liter flask with a nitrogen atmosphere was charged 2028 grams maleic anhydride which was melted. At 60° C., the addition of 1972 grams of 1-methoxy-2-propanol was begun. The temperature was allowed to rise to 120° C. and held at this temperature during the 4.5 hour addition time. The reaction mixture cooled to 80° C. and was held at this temperature for 8 hours, then cooled. The acid value was 301.5. Then 1600 grams of the reaction product above was charged with 5.19 grams of triphenyl phosphine to an autoclave and degassed with nitrogen. The mixture was stirred and heated to 85 degrees, and propylene oxide (749 grams) was fed into the reactor over 3 hours. Then the reacting mixture was held at temperature for 3.6 hours, when the product was vacuum stripped of residual propylene oxide. The product had a viscosity of 104 centipoises at 25° C., an acid number of 0.55 milligrams KOH/gram of resin and a density of 9.39 pounds per gallon (1.12 grams per cubic centimeter).

Example I

Benzyl 2-Hydroxy-1-Propyl Maleate Reactive Diluent

In reactions corresponding to Example H, benzyl alcohol, maleic anhydride, and propylene oxide were reacted to yield benzyl 2-hydroxy-1-propyl maleate reactive diluent in accordance with the present invention.

Example J

2-Hydroxy-1-Propyl 1-Phenylethyl Maleate Reactive Diluent

In reactions corresponding to Example H, above, sec-phenylethyl alcohol (1-phenylethanol) was reacted with maleic anhydride and propylene oxide to yield 2-hydroxy-1-propyl 1-phenylethyl maleate reactive diluent in accordance with the present invention. The product had a viscosity of 253 centipoise, an acid number of 0.74, and a density of 9.32 pounds per gallon (1.12 grams per cubic centimeter).

Example K

Hydroxypropyl Methyl Maleate Reactive Diluent

Hydroxypropyl methyl maleate reactive diluent in accordance with the present invention was prepared as follows. Maleic anhydride (1470 grams) was charged to a one gallon autoclave. To the molten anhydride at 60° C. was added 508 grams of methanol over 4 hours. The reaction mixture was held at temperature for 3.5 hours, during which time samples were taken to monitor by infrared analysis the extent of anhydride conversion, after which the reaction product was cooled. The product had an acid value of 406. Then 8.9 grams of triphenylphosphine and 8.9 grams of triphenylphosphite were added. The reactor was pressured with nitrogen three times and vented, the last time 5 pounds per square inch gauge (35 kPa) was left in the reactor. The reactor was heated to 80° C. and 1153 grams propylene oxide was fed into the reactor over 3 hours. Over the next 6 hours, while holding at 80 C., 230 grams of additional propylene oxide was added. The final pressure was 43 pounds per square inch gauge (296 kPa). The product was then vacuum stripped to remove residual propylene oxide. The product of the reaction had a viscosity of 65 centipoises, density of 9.70, and an OH number of 276. The acid value was 1.33.

Example L

Di(tetrahydrofurfuryl) Maleate Reactive Diluent

Di(tetrahydrofurfuryl) maleate reactive diluent in accordance with the present invention was prepared as follows. To a one liter, 4-neck flask fitted with $N_2$ sparge tube, temperature sensor, stirrer, Vigreaux distillation column and head and condenser, were charged 258 grams of diethyl maleate, 307 grams of tetrahydrofurfuryl alcohol (2-(hydroxymethyl) tetrahydrofuran), 0.5 grams of 2,6-di(t-butyl)-p-cresol and 2.26 grams Tyzor® TBT tetrabutyl titanate catalyst from E. I. DuPont deNemours & Co.

The reaction was heated to 215° C. over 2 hours, during which time 166 milliliters of ethanol was collected (theoretically predicted: about 170 milliliters) at head temperatures from 63° to 92° C. The product had a viscosity of 40 centipoises and was about 94% pure di(tetrahydrofurfuryl)maleate by gas chromatography analysis. Diethyl maleate (CAS 141-05-9) and tetrahydrofurfuryl alcohol (CAS 97-99-4) were both obtained from Aldrich Chemical Company.

Example M

Di(tetrahydrofurfuryl) Fumarate Reactive Diluent

Di(tetrahydrofurfuryl) fumarate reactive diluent in accordance with the present invention was prepared as follows. To a one liter, 4-neck flask fitted with $N_2$ sparge tube, temperature sensor, stirrer, Vigreaux distillation column and head and condenser, were charged 216 grams of dimethyl fumarate, 313 grams of tetrahydrofurfuryl alcohol (2-(hydroxymethyl)tetrahydrofuran), 1.0 gram triphenyl phosphite and 4.5 grams Tyzor®E TPT tetraisopropyl titanate catalyst from E. I. DuPont deNemours & Co.

The reaction was heated to 215° C. over 1 hour and 20 minutes, during which time 108 milliliters of methanol was collected at head temperatures from 26 to 65° C. The product was about 93–94% pure di(tetrahydrofurfuryl) fumarate by gas chromatography analysis. Dimethyl fumarate (CAS 624-49-7) and tetrahydrofurfuryl alcohol (CAS 97-99-4) were both obtained from Aldrich Chemical Company.

Example 1

Coating Formulation

The following describes the preparation of a UV light curable coating formulation containing a reactive diluent in accordance with the present invention. The viscosity of this formulation is reported in TABLE 1. The following materials were mixed together in a suitable container under low shear conditions through the use of a standard stir blade.

| Material | Weight (grams) |
| --- | --- |
| Unsaturated polyester resin of Example A | 19.8 |
| Hydroxypropyl methyl maleate reactive diluent of Example C | 9.7 |
| DVE-3* | 10.1 |
| DAROCUR 1173** | 0.45 |

*DVE-3 is triethylene glycol divinyl ether available commercially from ISP, Inc.
**DAROCUR 1173 is a photoinitiator containing α,α-dimethyl-α-hydroxyacetophenone available from Ciba-Geigy Corp.

Example 2

Comparative Coating Formulation

The following is a comparative example describing the preparation of a UV light curable coating formulation made without a reactive diluent. As a result, the coating formulation had a much higher final viscosity as reported in TABLE 1. The following materials were mixed together in a suitable container under low shear conditions through the use of a standard stir blade.

| Material | Weight (grams) |
| --- | --- |
| Unsaturated polyester resin of Example A | 45.0 |
| DVE-3 | 11.2 |
| DAROCUR 1173 | 0.6 |

Example 3

Coating Formulation

The following describes the preparation of a UV-light curable coating formulation containing a reactive diluent in accordance with the present invention. This formulation has an advantageously low viscosity as reported in Table 1.

| Material | Weight (grams) |
| --- | --- |
| Unsaturated polyester resin of Example A-1 | 4274.0 |

| Material | Weight (grams) |
| --- | --- |
| "IONOL" antioxidant | 21.65 |

| Material | Weight (grams) |
| --- | --- |
| Hydroxypropyl methyl maleate reactive diluent of Example C | 3640.40 |

| Material | Weight (grams) |
| --- | --- |
| DVE-3 | 2305.38 |

Charge 1 was heated to 120° C., and Charge 2 was added with agitation. The mixture was permitted to cool slowly, and Charge 3 was slowly added at 117° C. while agitation continued. When the mixture cooled below 100° C. Charge 4 was added slowly while agitation and cooling continued.

The formulation was then completed by mixing the following materials in a suitable container under low shear conditions through the use of a standard stir blade.

| Material | Weight (grams) |
| --- | --- |
| Unsaturated polyester resin and diluent mixture prepared above | 10,100.0 |
| Vinyl ether containing urethane resin of Example E | 1600.0 |
| DAROCUR 1173 | 239.0 |

TABLE 1

| Coating Formulation | Viscosity (cPs) |
| --- | --- |
| Example 1 | 4,800 |
| Example 2 | 690,000 |
| Example 3 | 2,400 |

Viscosity was measured using a Brookfield viscometer and is given in units of centipoise (cPs).

Examples 4 through 9 which follow compare the cure response of hydroxy functional 2-butene-1,4-dioic acid esters of the present invention with corresponding dioic acid esters without hydroxyl functionality. The cure response comparisons are set forth in Table 2 and Table 3. The cure responses of the diluents were tested without the presence of the unsaturated polyester polymer of the coating formulations with which they would be used. These data are for the purpose of comparing the cure responses of the reactive diluents themselves and their predicted behavior in coating compositions; they are not representative of the curing responses of complete coating compositions.

Example 4

Diluent of the Present Invention

The following describes the preparation of an electron beam curable mixture incorporating one of the preferred reactive diluents of the present invention. The cure response of this mixture is described in TABLE 2. The following materials were mixed together in a suitable container under low shear conditions through the use of a standard stir blade.

| Material | Weight (grams) |
| --- | --- |
| DVE-3* | 34.9 |
| Hydroxypropyl methyl maleate reactive diluent of Example C | 65.0 |

*With 0.1% "IONOL" BHT butylated hydroxy toluene antioxidant from Shell Chemical (2,6-di-tert-butyl-4-methyl phenol).and 0.1% dimethylethanolamine added (based on weight of DVE-3).

Example 5

Comparative Diluent

The following describes the preparation of a comparative electron beam curable mixture incorporating a dialkyl maleate ester rather than a hydroxy alkyl maleate ester of the present invention. The cure response of this mixture is described in TABLE 2. The following materials were mixed together in a suitable container under low shear conditions through the use of a standard stir blade.

| Material | Weight (grams) |
| --- | --- |
| DVE-3* | 37.0 |
| Diethyl maleate** | 63.0 |

*With 0.1% "IONOL" BHT butylated hydroxy toluene antioxidant from Shell Chemical (2,6-di-tert-butyl-4-methyl phenol).and 0.1% dimethylethanolamine added (based on weight of DVE-3).
**The diethyl maleate is available as D-9770-3 from Aldrich Chemical Company, Milwaukee, Wisconsin, and is the reaction of two moles of ethanol with one mole of dimethyl maleate, with methanol being removed by distillation.

Example 6

Comparative Diluent

The following describes the preparation of a comparative electron beam curable mixture incorporating a dialkyl fumarate ester rather than the hydroxy alkyl maleate esters of the present invention. The cure response of this mixture is described in TABLE 2. The following materials were mixed together in a suitable container under low shear conditions through the use of a standard stir blade.

| Material | Weight (grams) |
|---|---|
| DVE-3* | 37.0 |
| Diethyl fumarate** | 63.0 |

*With 0.1% "IONOL" BHT butylated hydroxy toluene antioxidant from Shell Chemical (2,6-di-tert-butyl-4-methyl phenol).and 0.1% dimethylethanolamine added (based on weight of DVE-3).
**The diethyl fumarate is available as D-9565-4 from Aldrich Chemical Company, Milwaukee, Wisconsin, and is the reaction of two moles of ethanol with one mole of dimethyl fumarate, with methanol removed by distillation.

The following table lists data comparing the cure responses of the electron beam (EB) curable mixtures described in Examples 4 through 6. The mixtures were drawn down over an untreated aluminum substrate using a number 038 wire-wound draw-down bar (a stainless steel rod 1.27 centimeters in diameter and 40 centimeters long, wound with 0.96 millimeter diameter stainless steel wire). The wet films underwent the following EB cure cycle: 5 megarads, 250 KeV, 19.6 milliamps, 100 feet per minute (30 meters per minute) line speed, nitrogen atmosphere (less than 100 ppm $O_2$).

TABLE 2

| Coating Formulation | Cure Response |
|---|---|
| Example 4 | Cured but soft. |
| Example 5 | Wet film, no cure. |
| Example 6 | Wet film, no cure. |

This demonstrates that the diluent of Example C participates in a radiation cure reaction to a much greater extent than the comparative diluents. It may be noted that the diluent of Example C was also shown in Example 1 and Table 1 to have the ability to substantially lower the viscosity of a radiation curable coating composition containing substantial amounts of unsaturated polyester resin.

Example 7

Diluent of the Present Invention

The following describes the preparation of an ultraviolet (UV) light curable mixture incorporating a reactive diluent in accordance with the present invention. The cure response of this mixture is described in TABLE 3. The following materials were mixed together in a suitable container under low shear conditions through the use of a standard stir blade.

| Material | Weight (grams) |
|---|---|
| DVE-3 | 21.0 |
| Hydroxypropyl methyl maleate reactive diluent of Example C | 39.0 |
| DAROCUR 1173 | 0.6 |

Example 8

Comparative Diluent

The following describes the preparation of a UV-light curable mixture incorporating a dialkyl maleate ester rather than the hydroxyl alkyl maleate esters of the present invention. The cure response of this mixture is described in Table 3. The following materials were mixed together in a suitable container under low shear conditions through the use of a standard stir blade.

| Material | Weight (grams) |
|---|---|
| Dibutyl maleate* | 41.6 |
| DVE-3 | 18.4 |
| DAROCUR 1173 | 0.6 |

*90% solution available as number 27751-7 from Aldrich Chemical Corporation, Milwaukee, Wisconsin.

Example 9

Comparative Diluent

The following describes the preparation of a UV-light curable mixture incorporating a dialkyl fumarate ester rather than the hydroxy alkyl dioic acid esters of the present invention. The cure response of this mixture is described in Table 3. The following materials were mixed together in a suitable container under low shear conditions through the use of a standard stir blade.

| Material | Weight (grams) |
|---|---|
| Dibutyl fumarate* | 41.6 |
| DVE-3 | 18.4 |
| DAROCUR 1173 | 0.6 |

*Dibutyl fumarate 5420 from Kodak--a reaction of two moles of butanol with one mole of dimethyl fumarate, the methanol being removed by distillation.

The following table lists data comparing the cure responses of the UV curable mixtures described in Examples 7 through 9. The formulations were drawn down over an untreated cold rolled steel substrate using a number 018 wire wound draw down bar (a stainless steel rod 1.27 centimeters in diameter and 40 centimeters long, wound with 0.46 millimeter diameter stainless steel wire). The wet films underwent the following ultraviolet light cure cycle: two 200 watt/inch lamps (80 watts per centimeter); four inch (10 centimeter) lamp height above the coated substrate; 120 feet per minute (36 meters per minute) line speed.

TABLE 3

| Coating Formulation | Cure Response |
|---|---|
| EXAMPLE 7 | Film was cured. |
| EXAMPLE 8 | Soft film, only a slight surface cure or "skinning over" of surface |
| EXAMPLE 9 | Wet film, no cure. |

Examples 10, 11, and 12 which follow demonstrate the cure response of reactive diluents of the present invention that are maleate and fumarate esters of tetrahydrofurfuryl alcohol relative to that of the hydroxypropyl methyl maleate ester of Example C, which is also an embodiment of the present invention. The cure responses of the diluents were tested without the presence of the unsaturated polyester polymer of the coating formulations. The results are set forth in Table 4.

Example 10

Diluent of the Present invention

The following describes the preparation of an ultraviolet light curable mixture incorporating maleate ester of tetrahydrofurfuryl alcohol, which is a reactive diluent in accordance with the present invention. The following materials were mixed together in a suitable container under low shear conditions through the use of a standard air blade.

| Material | Weight |
| --- | --- |
| DVE-3* | 16.4 |
| THF maleate reactive diluent of Example L | 43.6 |
| DAROCUR 1173 | 1.2 |

*With 0.1% "IONOL" BHT butylated hydroxy toluene antioxidant from Shell Chemical (2,6-di-tert-butyl-4-methyl phenol).and 0.1% dimethylethanolamine added (based on weight of DVE-3).

Example 11

Diluent of the Present Invention

The following describes the preparation of an ultraviolet light curable mixture incorporating the fumarate ester of tetrahydrofurfuryl alcohol, one of the reactive diluents of the present invention. The following materials were mixed together in a suitable container under low shear conditions through the use of a standard air blade.

| Material | Weight |
| --- | --- |
| DVE-3* | 16.4 |
| THF fumarate reactive diluent of Example M | 43.6 |
| DAROCUR 1173 | 1.2 |

*With 0.1% "IONOL" BHT butylated hydroxy toluene antioxidant from Shell Chemical (2,6-di-tert-butyl-4-methyl phenol).and 0.1% dimethylethanolamine added (based on weight of DVE-3).

Example 12

Diluent of the Present Invention

The following describes the preparation of an ultraviolet light curable mixture incorporating hydroxypropyl methyl maleate ester, one of the reactive diluents of the present invention. The following materials were mixed together in a suitable container under low shear conditions through the use of a standard air blade.

| Material | Weight |
| --- | --- |
| DVE-3* | 21.0 |
| Hydroxypropyl methyl maleate reactive diluent of Example C | 39.0 |
| DAROCUR 1173 | 1.2 |

*With 0.1% "IONOL" BHT butylated hydroxy toluene antioxidant from Shell Chemical (2,6-di-tert-butyl-4-methyl phenol).and 0.1% dimethylethanolamine added (based on weight of DVE-3).

The following table lists data comparing the cure responses of the UV curable mixtures described in Examples 10, 11, and 12. The mixtures were drawn down over coated paper card stock using a 005 wire wound draw down bar (a stainless steel rod 1.27 centimeters in diameter and 40 centimeters long, wound with 0.13 millimeter diameter stainless steel wire). The films underwent the following ultraviolet cure cycle: four 80 watt/centimeter standard medium pressure mercury are lamps with water cooled parabolic reflectors; four inch (10 centimeter) lamp height above the coated substrate; 12.2 meters per minute conveyor speed; air atmosphere. The degree of cure was determined by rubbing with a finger and observing whether any coating was picked up by the finger and if the surface was soft enough to became marred by the rubbing.

TABLE 4

| Coating Formulation | Cure Response |
| --- | --- |
| Example 10 | Slight mar; no pickup |
| Example 11 | Very slight mar; no pickup |
| Example 12 | Some mar; no pickup |

From the relative showing in Table 4, Examples 10 and 11 may be expected to perform as diluents in coating compositions at least as well as Example 12.

Example 13

The following describes the UV cure response of the coating formulation of Example 3. Drawdown was made with an "8-Path Wet Film Applicator" (Catalog No. 24, Paul N. Gardner Company, Inc.) using 10 mil gap (approximately 125 microns wet film thickness) onto coated paper card stock. The lamps were 80 watt/centimeter standard mercury with water-cooled parabolic reflectors. The lamp height was 10.2 centimeter and curing was done in air atmosphere at a line speed of 24.4 meters/minute with 4 lamps. Surface cure was good; the surface was not marred by rubbing.

The invention has been described with reference to particular embodiments for the sake of providing the best mode of carrying out the invention, but it should be understood that other alternatives and variations known to those of skill in the art may be resorted to without departing from the scope of the invention as defined by the claims which follow.

What is claimed is:

1. A liquid, radiation curable composition comprising:
   (a) an unsaturated polyester component comprising the reaction product of an unsaturated polycarboxylic acid or anhydride with polyhydric alcohol, said unsaturated polyester having a peak molecular weight, as measured by gel permeation chromatography, ranging from 500 to 50,000,
   (b) a vinyl ether component comprising at least one vinyl ether compound having the general formula:

where R is an alkyl, aryl, alkyl ether, aryl ether, alkyl ester or aryl ester group and n is at least 1, and
   (c) a reactive diluent component comprising a reactive diluent compound having the following structural formula:

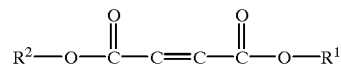

wherein at least one of $R^1$ and $R^2$ is an alkyl, cycloalkyl, or aralkyl group containing up to four carbon atoms wherein at least one of $R^1$ and $R^2$ is an alkyl, cycloalkyl or aralkyl group containing up to four carbon atoms and a hydroxyl group, ether group, or carbonate group, wherein at least one of $R^1$ and $R^2$ is a group that includes an oxygen with a carbon adjacent thereto and an abstractable hydrogen attached to the carbon, and wherein the reactive diluent has a viscosity of less than 1000 centipoise.

2. The composition of claim 1 wherein at least one of $R^1$ and $R^2$ includes an ether group.

3. The composition of claim 2 wherein the ether group is a heterocyclic ether.

4. The composition of claim 3 wherein the ether group is derived from tetrahydrofurfuryl alcohol.

5. The composition of claim 1 wherein at least one of $R^1$ and $R^2$ is a group having the following structure:

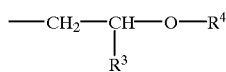

where $R^3$ and $R^4$ are hydrogen, alkyl, cycloalkyl, aralkyl groups, or $R^3$ and $R^4$ join to form a heterocyclic ring.

6. The composition of claim 5 wherein $R^3$ is a methyl group and $R^4$ is hydrogen.

7. The composition of claim 5 wherein at least one of $R^1$ and $R^2$ is the residue of tetrahydrofurfuryl alcohol.

8. The composition of claim 1 wherein the reactive diluent is an ester of maleic acid.

9. The composition of claim 1 wherein the reactive diluent is an ester of fumaric acid.

10. The composition of claim 1 where the viscosity of the reactive diluent is less than 500 centipoise.

11. The composition of claim 1 where the viscosity of the reactive diluent is less than 300 centipoise.

12. The composition of claim 1 wherein the initial applied viscosity of the composition is in the range from 10 to 50,000 centipoises.

13. The composition of claim 1 where the unsaturated polyester has a peak molecular weight as measured by gel permeation chromatography ranging from 1,000 to 25,000.

14. The composition of claim 1 wherein the content of the three components, based on weight percent of the total weight of the three components is:

5 to 75% component (a);

5 to 75% component (b); and 5 to 75% component (c).

15. The composition of claim 1 further comprising a photoinitiator.

16. The composition of claim 1 comprising a thermal polymerization inhibitor.

17. A liquid, radiation curable composition comprising:

(a) an unsaturated polyester component comprising the reaction product of an unsaturated polycarboxylic acid or anhydride with polyhydric alcohol, said unsaturated polyester having a peak molecular weight, as measured by gel permeation chromatography, ranking from 500 to 50,000, (b) a vinyl ether component comprising at least one vinyl ether compound having the general formula:

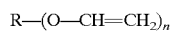

where R is an alkyl, aryl, alkyl ether, aryl ether, alkyl ester or aryl ester group and n is at least 1, and (c) a reactive diluent component comprising a reactive diluent compound having the following structural formula:

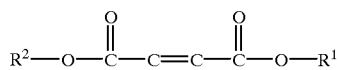

wherein $R^1$ is an alkyl group containing up to four carbon atoms wherein $R^2$ is an alkyl group containing up to four carbon atoms and a hydroxyl group, wherein at least one of $R^1$ and $R^2$ is a ground that includes an oxygen with a carbon adjacent thereto and an abstractable hydrogen attached to the carbon, and wherein the reactive diluent has a viscosity of less than 1000 centipoise.

18. The composition of claim 17 wherein $R^1$ is a propyl group.

19. The composition of claim 18 wherein $R^2$ is a 2-hydroxypropyl group.

20. The composition of claim 19 wherein $R^1$ is a methyl group.

* * * * *